(12) United States Patent
Tanaka et al.

(10) Patent No.: US 9,164,296 B2
(45) Date of Patent: Oct. 20, 2015

(54) SOFT CONTACT LENS APPLICATION METHOD, LIQUID FOR CONTACT LENSES AND SOFT CONTACT LENS PACKAGE

(75) Inventors: Yasunori Tanaka, Nagoya (JP); Hiroyuki Yamaguchi, Nagoya (JP); Takashi Yamamoto, Kasugai (JP)

(73) Assignee: MENICON CO., LTD., Nagoya-shi (JP)

( * ) Notice: Subject to any disclaimer, the term of this patent is extended or adjusted under 35 U.S.C. 154(b) by 0 days.

(21) Appl. No.: 13/988,016

(22) PCT Filed: Nov. 17, 2010

(86) PCT No.: PCT/JP2010/070487
§ 371 (c)(1),
(2), (4) Date: Jul. 22, 2013

(87) PCT Pub. No.: WO2012/066655
PCT Pub. Date: May 24, 2012

(65) Prior Publication Data
US 2013/0293833 A1    Nov. 7, 2013

(51) Int. Cl.
*G02C 7/02* (2006.01)
*G02C 7/04* (2006.01)
*B29D 11/00* (2006.01)
*A45C 11/00* (2006.01)

(52) U.S. Cl.
CPC ............. *G02C 7/047* (2013.01); *A45C 11/005* (2013.01); *B29D 11/00067* (2013.01); *G02C 7/024* (2013.01); *G02C 7/049* (2013.01)

(58) Field of Classification Search
CPC ....... G02C 7/024; G02C 7/049; C11D 3/0078
USPC ............. 351/159.18, 159.19, 159.36, 159.73, 351/159.74
See application file for complete search history.

(56) References Cited

U.S. PATENT DOCUMENTS

| 2003/0109390 A1 | 6/2003 | Salpekar et al. |
| 2006/0122080 A1* | 6/2006 | Mori ............................. 510/112 |
| 2007/0286767 A1 | 12/2007 | Burke et al. |
| 2008/0214421 A1 | 9/2008 | Zhao et al. |
| 2008/0261841 A1* | 10/2008 | Heiler ........................... 510/112 |
| 2008/0307751 A1 | 12/2008 | Newman et al. |
| 2008/0317625 A1* | 12/2008 | Vogt et al. ........................ 422/26 |
| 2009/0092575 A1 | 4/2009 | MacLeod |
| 2010/0140114 A1 | 6/2010 | Pruitt et al. |

FOREIGN PATENT DOCUMENTS

| JP | 3029164 U | 9/1996 |
| JP | 2002-504238 | 2/2002 |
| JP | 2003-107413 | 4/2003 |
| JP | 2003-171276 | 6/2003 |
| JP | 2003-255276 | 9/2003 |
| JP | 2005-84558 | 3/2005 |
| JP | 2007-000518 | 1/2007 |
| JP | 2007-140219 | 6/2007 |
| JP | 2008-537889 | 10/2008 |
| JP | 2009-86619 | 4/2009 |
| WO | WO 2006/038080 | 4/2006 |
| WO | WO 2008/051733 | 5/2008 |
| WO | WO 2009/097028 | 8/2009 |

OTHER PUBLICATIONS

Extended European Search Report for corresponding EP Application No. 10859699.0-1562, Apr. 10, 2014.
International Search Report for corresponding International Application No. PCT/JP2010/070487, Dec. 21, 2010.

\* cited by examiner

*Primary Examiner* — Jordan Schwartz
(74) *Attorney, Agent, or Firm* — Oliff PLC

(57) ABSTRACT

An object of the invention is to provide an application method capable of facilitating the application of the soft contact lens without using any instrument, a liquid for contact lenses capable of being used for the application method, and a soft contact lens package. The present invention is a method for applying a soft contact lens, including a shrinkage step of shrinking a soft contact lens by contacting the soft contact lens with a liquid for contact lenses, the liquid for contact lenses being capable of shrinking the soft contact lens to a state of being more intensively shrunken than an equilibrium state thereof in a physiological saline; and an application step of applying the shrunken soft contact lens to the eye, in which after the application step, the size of the soft contact lens is restored.

19 Claims, No Drawings

SOFT CONTACT LENS APPLICATION METHOD, LIQUID FOR CONTACT LENSES AND SOFT CONTACT LENS PACKAGE

BACKGROUND OF THE INVENTION

The present invention relates to a method for applying a soft contact lens, a liquid for contact lenses and a soft contact lens package.

FIELD OF THE INVENTION

Soft contact lenses are larger in size (with a diameter of about 14 mm) as compared to hard contact lenses, which generally have a diameter of about 9 mm, and the size of soft contact lenses specialized for astigmatism, presbyopia, bifocal use, and the like is much larger. As a result, the soft contact lenses are difficult to apply, and improvement in easy of application is a requirement users desire to be improved. In particular, the improvement is desired to be adapted for children, who have a narrow lid aperture, as well as the elderly.

On the other hand, simply reducing the size of a lens may facilitate application of the lens. However, when a small-sized soft contact lens is applied, the lens moves in a broad area on the surface of the eyeball, leading to inferior stability, which causes poor perspective and inferior wearing sensation and the like, whereby the functions of the contact lens may be impaired.

Under such circumstances, instruments capable of holding and applying a contact lens via an attachment portion such as an adhesive disc as means for facilitating the application of the contact lens have been developed (see, Japanese Utility Model Registration No. 3029164, Japanese Patent Application No. 2001-337201 and Japanese Unexamined Patent Application, Publication No. 2003-255276). However, the instruments suffer from several disadvantages in application of a contact lens using the instruments, such as a certain period of time required for familiarization and further the instrument must be always carried.

PRIOR ART DOCUMENTS

Patent Documents

Patent Document 1: Japanese Utility Model Registration No. 3029164
Patent Document 2: Japanese Patent Application No. 2001-337201
Patent Document 3: Japanese Unexamined Patent Application, Publication No. 2002-100614

SUMMARY OF THE INVENTION

The present invention was made in view of the foregoing circumstances, and an object of the invention is to provide an application method capable of facilitating the application of the soft contact lens without using any instrument, a liquid for contact lenses capable of being suitably used for the application method, and a soft contact lens package.

Means for Solving the Problems

A method for applying a soft contact lens according to an embodiment of the present invention, which has been made for solving the foregoing problems includes:
a shrinkage step of shrinking a soft contact lens by contacting the soft contact lens with a liquid for contact lenses, the liquid for contact lenses being capable of shrinking the soft contact lens to a state of being more intensively shrunken than an equilibrium state thereof in a physiological saline; and
an application step of applying the shrunken soft contact lens to the eye;
in which after the application step, the size of the soft contact lens is restored.

According to the method for applying a soft contact lens, a soft contact lens, which is generally large in size, is reduced in size by shrinking the soft contact lens in the shrinkage step, which may facilitate the application to the eye, and the size of the soft contact lens is restored (expands) after the application, which enables the functions of normal contact lenses to be exhibited. In the application method, the soft contact lens is shrunken by contacting the soft contact lens with the liquid for contact lenses as described above; therefore, for example by using the present liquid for contact lenses as a storage solution, the soft contact lens can be easily applied without using an instrument or the like separately. As used herein, the term "physiological saline" refers to a 0.9% by mass aqueous sodium chloride solution at 20° C.

The soft contact lens is preferably a hydrous soft contact lens. According to the application method, when the hydrous soft contact lens is used, change in moisture content of the soft contact lens may be utilized to enable the soft contact lens to readily return to a conventional size after the application through permeation of the lacrimal fluid or the like, and thereby the contact lens may be worn without any impairment of the functions of the lens.

The amount of shrinkage in diameter of the soft contact lens in the shrinkage step is preferably no less than 0.2 mm. According to the application method, shrinking the diameter of the soft contact lens by no less than 0.2 mm, allows for, from a physical perspective, the improvement of the ease of application, and additionally from a psychological perspective, reduced concern regarding the application of the contact lens, because of the user being capable of realizing the change in the size of the lens.

The restoration rate of the diameter of the soft contact lens after the application step is preferably no less than 80%. According to the application method, the restoration of the diameter of the lens by no less than 80% after the application can enable the soft contact lens to function similarly to normal soft contact lenses after the application, even when the soft contact lens is applied in a state of being shrunken.

The amount of restoration of the diameter of the soft contact lens after the application step is preferably no less than 0.2 mm. According to the application method, restoration (expansion) of the diameter of the lens by no less than 0.2 mm after the application can enable the soft contact lens to function similarly to normal soft contact lenses after the application, even when the soft contact lens is applied in a state of being shrunken.

The osmolarity of the liquid for contact lenses is preferably no less than 370 mOsm/L. According to the application method, by using the liquid for contact lenses having such a high osmolarity, the osmotic pressure of the liquid for contact lenses may be effectively utilized to attain the shrinkage of the soft contact lens.

The liquid for contact lenses preferably contains phosphoric acid and a phosphoric acid salt. According to the application method, due to the liquid for contact lenses used containing phosphoric acid and a phosphoric acid salt, the osmolarity, pH or the like of the liquid for contact lenses can be easily adjust to a preferred range, which makes it possible to shrink the soft contact lens more efficiently.

In the shrinkage step, the temperature of the liquid for contact lenses is preferably set to no less than 35° C. and no greater than 50° C. According to the application method, the contact of the liquid for contact lenses at a comparatively high temperature with the soft contact lens may induce thermal motion of the molecules constituting the soft contact lens, to reduce the moisture content of the soft contact lens, and to promote the shrinkage of the soft contact lens.

The liquid for contact lenses according to an embodiment of the present invention is a liquid for contact lenses which is capable of shrinking the diameter of a soft contact lens by no less than 0.2 mm as compared to the diameter in an equilibrium state in a physiological saline through the contact with the soft contact lens, and in which the osmolarity of the liquid for contact lenses is no less than 370 mOsm/L.

According to the liquid for contact lenses, the osmotic pressure may be utilized to efficiently shrink the soft contact lens, and thereby the user can easily apply the soft contact lens.

It is preferred that the liquid for contact lenses can reversibly induce the shrinkage as described above. If the liquid for contact lenses is a liquid for contact lenses which can reversibly induce the shrinkage of the soft contact lens, that is, a liquid for contact lenses in which after shrinking the soft contact lens, contact of the physiological saline with the shrunken soft contact lens induces the restoration of the size of the lens, the size of the contact lens will be readily restored by the action of the lacrimal fluid after the application of the contact lens, and the contact lens may function similarly to the normal soft contact lenses.

The soft contact lens package according to an embodiment of the present invention includes:

a soft contact lens container; the above-described liquid for contact lenses pooled in the soft contact lens container; and a soft contact lens immersed in the liquid for contact lenses.

According to the soft contact lens package, the soft contact lens can be contained in the vessel in a state of being shrunken and therefore, by using the soft contact lens package in a distribution stage, the size of the vessel may be reduced; and furthermore, for example, vessels of common size may be employed irrespective of the lens size, and therefore the use of the soft contact lens package may lead to the reduction of production cost.

Effects of the Invention

As explained above, the method for applying a soft contact lens according to an embodiment of the present invention enables the soft contact lens to be readily applied without using any instrument or the like, and particularly is useful for children, who have a narrow lid aperture a small fissure width, and the elderly. By using the liquid for contact lenses according to an embodiment of the present invention, the ease of application of large-sized general soft contact lenses is enhanced. In addition, the soft contact lens package according to an embodiment of the present invention can enhance the ease of application of the soft contact lens, and contribute to the improvement of the efficiency of the production and distribution stages and the like of the soft contact lens.

Moreover, the liquid for contact lenses according to an embodiment of the present invention may be used as a conventional storage solution, a packaging liquid, a wetting solution, a multipurpose solution or the like for a soft contact lens, and may enhance added value of these respective liquids.

In addition, according to the application method according to an embodiment of the present invention, contact lenses larger in size than conventional ones can be applied to the eye.

The contact lens larger in size allows for more stable vision correction, and additionally can provide contact lenses of such a size as to hide the white part of the eye for the purpose of making an injected and reddened white part of the eye (bulbar conjunctiva) or an age-related, jaundiced white part of the eye attractive. Furthermore, large contact lenses of such a size enhance the effect of functional contact lenses exhibiting ultraviolet rays-absorbing function and the like, and are resistant to removal even when they are used in sports involving hard physical contact, such as rugby, which widens a scope of intended usage of the soft contact lenses.

DESCRIPTION OF THE PREFERRED EMBODIMENTS

Hereinafter, embodiments of the method for applying a soft contact lens, liquid for contact lenses and soft contact lens package according to the present invention will be explained in detail.

<Method for Applying a Soft Contact Lens>

The method for applying a soft contact lens according to an embodiment of the present invention includes:

a shrinkage step of shrinking a soft contact lens by contacting the soft contact lens with a liquid for contact lenses, the liquid for contact lenses being capable of shrinking the soft contact lens to a state of being more intensively shrunken than an equilibrium state thereof in a physiological saline; and an application step of applying the shrunken soft contact lens to the eye in which after the application step, the size of the soft contact lens is restored.

According to the method for applying a soft contact lens, a soft contact lens, which is generally large in size, is reduced in size by shrinking the soft contact lens in the shrinkage step, which may facilitate the application to the eye, and the size of the soft contact lens is restored (expands) after the application, which enables the functions of normal contact lenses to be exhibited. In the application method, the soft contact lens is shrunken by contacting the soft contact lens with the liquid for contact lenses as described above; therefore, for example by using the present liquid for contact lenses as a storage solution, the soft contact lens can be easily applied without using an instrument or the like. Hereinafter, each step will be explained.

<Shrinkage Step>

In the shrinkage step, the soft contact lens is shrunken by contacting the soft contact lens with the liquid for contact lenses.

<Soft Contact Lens>

The soft contact lens to be shrunken is not particularly limited, and a hydrous soft contact lens such as that formed of HEMA (hydroxyethyl methacrylate), N-VP (N-vinylpyrrolidone), DMAA (dimethylacrylamide), glycerol methacrylate (GMA) or the like, or a non-hydrous soft contact lens such as that formed of silicone rubber, butyl acrylate, dimethylsiloxane or the like may be used, and the hydrous soft contact lens is preferably used.

When the hydrous soft contact lens is used, its moisture content may be reduced by the liquid for contact lenses in the shrinkage step. According to the application method, such change in moisture content of the soft contact lens may be utilized to enable the soft contact lens to readily return to a conventional size after the application through permeation of the lacrimal fluid or the like, and thereby the contact lens may be worn without any impairment of the functions of the lens.

The moisture content of the hydrous soft contact lens is preferably no less than 30% by mass, more preferably no less than 40% by mass and still more preferably no greater than 80% by mass, in order to effectively attain the shrinkage of the lens size resulting from the above-described change in moisture content.

As used herein, the moisture content (% by mass) is a value calculated according to the following equation (1).

$$\text{Moisture content (\% by mass)} = [(\text{the mass of the lens after hydration (g)} - \text{the mass of the lens before hydration (g)})/\text{the mass of the lens after hydration (g)}] \times 100 \quad (1)$$

In addition, the soft contact lens may be a nonionic soft contact lens, or an ionic soft contact lens having an ionic group such as a carboxyl group incorporated.

The size of the soft contact lens may be comparable to a size of normal soft contact lenses, and specifically is on the order of no less than 13.0 mm and no greater than 14.5 mm. In addition, the application method is also sufficiently applicable to soft contact lenses having a size of no less than 14.5 mm, which are particularly used for soft contact lenses for astigmatism, presbyopia, bifocal use, and other specialized intended usages.

<Liquid for Contact Lenses>

The liquid for contact lenses used in the shrinkage step is not particularly limited as long as the liquid for contact lenses can shrink the soft contact lens to a size smaller than an equilibrium state in a physiological saline upon the contact with the soft contact lens.

Examples of the liquid for contact lenses may include a liquid having an osmolarity of no less than 370 mOsm/L and a liquid with its pH adjusted, and the like.

According to the method employing the liquid having an osmolarity of no less than 370 mOsm/L, the osmotic pressure of the liquid may be effectively utilized to efficiently reduce the moisture content of the soft contact lens in the shrinkage step, and facilitate the shrinkage of the contact lens. It is to be noted that after the soft contact lens shrunken by using the liquid having such a high osmolarity is applied to the eye, the contact of the soft contact lens with the lacrimal fluid allows the lacrimal fluid to penetrate(infiltrate) into the soft contact lens, and the size of the soft contact lens readily returns to the size before the shrinkage.

The osmolarity of the liquid is no less than 370 mOsm/L, and preferably no less than 400 mOsm/L, and more preferably no less than 420 mOsm/L. On the other hand, the osmolarity is preferably no greater than 550 mOsm/L. If the osmolarity is below the lower limit, a certain level of the shrinkage may not occur even after a sufficient time has elapsed as the shrinkage step, and improvement of the easy of application of the contact lens may not be expected. On the contrary, if the osmolarity is above 550 mOsm/L, severe irritation to the eye during the application may be caused. Additionally, in some cases, damage to the eye may be caused due to high osmotic pressure.

Furthermore, in the shrinkage step, the temperature of the liquid for contact lenses is preferably set to no less than 35° C. and no greater than 50° C. According to the present method, the contact of the liquid for contact lenses at a comparatively high temperature with the soft contact lens may induce thermal motion of the molecules constituting the soft contact lens, to reduce the moisture content of the soft contact lens, and to promote the shrinkage of the soft contact lens. It is to be noted that after the soft contact lens shrunken by using the liquid for contact lenses set to the temperature described above is applied to the eye, the temperature of the contact lens is decreased by an ambient temperature, body temperature and heat of vaporization, and the moisture content, in turn, returns to a normal state, and thereby the size of the contact lens will also return to normal.

The temperature of the liquid during this process is no less than 35° C. and no greater than 50° C., but preferably no less than 37° C. and no greater than 45° C. If the temperature is below the lower limit, a certain level of the shrinkage may not occur even after a sufficient time has elapsed as the shrinkage step, and improvement of the easy of application of the contact lens may not be expected. On the contrary, if the temperature is above the upper limit, the contact lens may be brought to too high temperature when the contact lens is touched with a finger or applied to the eye in the application step, which may make handling worse.

Examples of means for adjusting the temperature of the liquid for contact lenses are not particularly limited, and may include a method in which a heat sterilizer of the contact lens is used, and a method in which any other well-known warmers is used, and the like.

The liquid for contact lenses may be an aqueous solution which contains an adjusted concentration of sodium chloride, a chelating agent, a buffer, a surfactant, a thickening agent, an antiseptic agent, a microbicide and the like. The respective components may be contained singly or in admixture of 2 or more thereof, and contained in such a range as to be safe to living organisms and not to inhibit the effects of the invention.

The chelating agent is a component contained for preventing a metal ion such as a calcium ion contained in the liquid for contact lenses or in the lacrimal fluid from settling onto the contact lens, and the like. Examples of the chelating agent may include ethylenediaminetetraacetic acid and sodium salts or iron complexes thereof, phytic acid, citric acid, and the like.

The buffer is a component used for keeping the pH of the liquid for contact lenses constant, as well as suppressing the change in pH by external factors, and protecting physical properties of the soft contact lens, and the like. Examples of the buffer are not particularly limited as long as the buffer is ophthalmologically and physiologically acceptable, and may include, for example, boric acid and a boric acid salt, phosphoric acid and a phosphoric acid salt, citric acid and a citric acid salt, lactic acid and a lactic acid salt, an amino acid such as glycine and glutamic acid and salts thereof, malic acid and a malic acid salt, and the like. The salt includes a sodium salt and the like. Of these buffers, a combination of phosphoric acid and a phosphoric acid salt is preferably used in view of the ease of adjustment of their concentration and pH.

The surfactant is a component used for the purpose of cleaning of the contact lens, and the like. Examples of the surfactant which may be used herein include any of well-known anionic surfactants, nonionic surfactants, amphoteric surfactants and cationic surfactants.

Specific examples of the surfactant may include, for example, polyglycerin fatty acid ester, polyoxyethylene alkyl ether, polyoxyethylene-polyoxypropylene block copolymer, polyoxyethylene-polyoxypropylene ethylenediamine, polyoxyethylene sorbitan fatty acid ester, polyoxyethylene alkyl phenyl ether formaldehyde condensates, polyoxyethylene hydrogenated castor oil, polyoxyethylene alkyl phenyl ether, polyoxyethylene glycerin fatty acid ester, polyoxyethylene sorbit fatty acid ester, polyoxyethylene castor oil, polyoxyethylene sterol, polyoxyethylene hydrogenated sterol, polyoxyethylene fatty acid ester, polyoxyethylene-polyoxypropylene alkyl ether, polyoxyethylene lanolin alcohol, polyoxyethylene alkylamine, polyoxyethylene alkylamide, polyoxyethylene alkyl ether phosphate, polysorbates, and the like.

The thickening agent is a component contained for adjusting the viscosity of the liquid for contact lenses, and the like, and specific examples thereof may include polyvinyl alcohol, poly-N-vinylpyrrolidone, polyacrylamide and hydrolysates thereof, polyacrylic acid, xanthan gum, hydroxyethylcellulose, carboxymethylcellulose, methylhydroxyethylcellulose, methylhydroxypropylcellulose, methylcellulose, sodium alginate, polyethylene glycol, gelatin, sodium chondroitin sulfate, sodium hyaluronate, gum arabic, guar gum, and the like.

The antiseptic agent and microbicide is not particularly limited as long as they are ophthalmologically acceptable, and examples thereof may include phenylmercury nitrate, phenylmercury acetate, thimerosal, benzalkonium chloride, pyridinium bromide, chlorhexidine, polyhexamethylene biguanide, chlorobutanol, methylparaben, propylparaben, dimethylol dimethylhydantoin, imidazolium urea and the like.

Additionally, the liquid for contact lenses may contain, as other components, a freshening agent represented by menthol and borneol, an anti-allergic agent represented by ketotifen and chlorpheniramine maleate, a drug for glaucoma represented by timolol and pilocarpine, vitamins and pharmaceutical preparations for other treatments.

<Contacting Method>

Methods for contacting the soft contact lens with the liquid for contact lenses in the shrinkage step are not particularly limited as long as the soft contact lens can be shrunken, and examples thereof may include a method in which the soft contact lens is immersed in the liquid for contact lenses, a method in which the liquid for contact lenses is dripped, coated, sprayed or otherwise applied onto the soft contact lens.

Of these contacting methods is preferred the method in which the soft contact lens is immersed in the liquid for contact lenses. Since the method by immersion can evenly shrink the soft contact lens, and further, the method may be performed as a part of the operations of cleaning, storage, boiling sterilization and the like of the soft contact lens during its daily use, the method by immersion puts no additional burden on the user, and is efficient.

In addition, according to the method by immersion, the liquid for contact lenses may be used in shipping and storage liquid for the soft contact during the process of distribution. Furthermore, the method by immersion may achieve size reduction of the package used in the distribution of the soft contact lens.

The amount of shrinkage of the diameter of the soft contact lens in the shrinkage step is preferably no less than 0.2 mm, and more preferably no less than 0.3 mm. According to the application method, by shrinking the diameter of the soft contact lens by no less than 0.2 mm, from a physical perspective, the ease of application may be improved, and additionally from a physiological perspective, due to the user being capable of realizing the change in the size of the lens, concern regarding the application of the contact lens can be lowered. The upper limit of the amount of shrinkage is not particularly limited, but is for example 1.5 mm in view of practical application.

The time period of contacting the soft contact lens with the liquid for contact lenses in the shrinkage step is not particularly limited as long as the soft contact lens is sufficiently shrunken; for example, if the liquid for contact lenses is a packaging liquid, the time period is a time period from the time of its manufacture to the time when the user opens the packaging liquid, and if the liquid for contact lenses is a wetting solution, the time period is a time period from the time when the user drips the liquid onto the contact lens to the time when the user applies the contact lens.

<Application Step>

In the application step, the shrunken soft contact lens is applied to the eye in a similar manner to the usual method. According to the method for applying a soft contact lens, the soft contact lens is shrunken through the shrinkage step, and thereby the soft contact lens can be easily applied without using an instrument or the like. It is to be noted that, after the application of the soft contact lens, the soft contact lens readily returns to its original size before the shrinkage, for example, through the permeation of the lacrimal fluid whose osmotic pressure is virtually comparable to the physiological saline, and therefore the contact lens may be worn without impairment of the functions of the lens.

The amount of restoration of the diameter of the soft contact lens after the application step is preferably no less than 0.2 mm. According to the application method, restoration (expansion) of the diameter of the lens by no less than 0.2 mm after the application can enable the soft contact lens to function similarly to the normal soft contact lenses, even when the soft contact lens is applied in a state of being shrunken.

In addition, the restoration rate of the diameter of the soft contact lens after the application step is preferably no less than 80%. According to the application method, the restoration of the diameter of the lens by no less than 80% after the application can enable the soft contact lens to function similarly to the normal soft contact lenses after the application, even when the soft contact lens is applied in a state of being shrunken. As used herein, the term "restoration rate (%)" refers to a value calculated according to the following formula (2):

$$\text{Restoration rate (\%)} = \{\text{amount of restoration (mm)} / \text{amount of shrinkage (mm)}\} \times 100 \qquad (2)$$

The time required for the diameter of the soft contact lens to be restored by no less than 0.2 mm after the application step is, for example, no greater than 10 min, and preferably no greater than 6 min.

<Liquid for Contact Lenses>

The liquid for contact lenses according to an embodiment of the present invention is a liquid for contact lenses which is capable of shrinking the diameter of a soft contact lens by no less than 0.2 mm as compared to the diameter in an equilibrium state in a physiological saline through the contact with the soft contact lens, and in which osmolarity thereof is no less than 370 mOsm/L. The present liquid for contact lenses is the same as that explained as an example of the liquid for contact lenses in the application method, and detailed explanation thereof will be omitted here.

According to the liquid for contact lenses, differential osmotic pressure may be utilized to efficiently shrink the soft contact lens, and thereby the user can easily apply the soft contact lens.

It is preferred that the liquid for contact lenses can reversibly induce the shrinkage as described above. If the liquid for contact lenses is a liquid for contact lenses which can reversibly induce the shrinkage of the soft contact lens, that is, a liquid for contact lenses in which after shrinking the soft contact lens, contact of the physiological saline with the shrunken soft contact lens induces the restoration of the size of the lens, the size of the contact lens will be readily restored by the action of the lacrimal fluid and the like after the application of the contact lens, and the contact lens may function similarly to the normal soft contact lenses.

Additionally, the extent of restoration of the lens size through the contact of the soft contact lens with the physiological saline after once shrinking the soft contact lens by the contact with the liquid for contact lenses is preferably a restoration (expansion) by no less than 0.2 mm from the lens size in the liquid for contact lenses, and more preferably, its diameter restores to within ±0.2 mm, still more preferably within ±0.1 mm as compared to the diameter in an equilibrium state in the physiological saline before the shrinkage.

It is to be noted that while the present liquid for contact lenses may be used only for intended usage aimed to facilitate the application, the liquid for contact lenses may be used as a conventional storage solution, a shipping and storage liquid, a wetting solution, a multipurpose solution or the like. As used herein, the term "multipurpose solution" refers to a liquid formulation capable of performing at least 2 or more of cleaning, rinsing, sterilization, storage of the contact lens in a single liquid.

By using the liquid for contact lenses as the storage solution or multipurpose solution, the easy of application of the soft contact lens may be improved without any difference from the handling of conventional soft contact lenses. Moreover, using the present liquid for contact lenses with respect to disposable contact lenses and the like as the shipping and storage liquid makes it feasible to provide size reduction or uniformalization of the package, and also achieves reduction of distribution cost.

<Soft Contact Lens Package>

The soft contact lens package according to an embodiment of the present invention includes:

a soft contact lens container, the above-described liquid for contact lenses pooled in the soft contact lens container, and a soft contact lens immersed in the liquid for contact lenses.

The liquid for contact lenses is the same as described above for the liquid for contact lenses according to an embodiment of the present invention, and therefore detailed explanation thereof will be omitted here. Additionally, as the soft contact lens container, well-known ones such as storage vessels during daily use and packages for disposable contact lenses may be used.

The soft contact lens is preferably a hydrous soft contact lens in order to efficiently exhibit the functions of the liquid for contact lenses. Specifically, the moisture content of the hydrous soft contact lens is preferably no less than 30% by mass, and more preferably no less than 40% by mass and no greater than 80% by mass.

According to the soft contact lens package, the soft contact lens can be stored in a state of being shrunken, and the ease of application during the use may be enhanced. Moreover, according to the soft contact lens package, the use thereof during the distribution stage can lead to size reduction of the vessel. Furthermore, vessels of common size may be employed irrespective of the lens size, which may lead to the reduction of production cost.

EXAMPLES

Hereinafter, the present invention will be explained in more detail by way of Synthesis Examples and Examples, but the present invention is not limited thereto.

Detail of the respective soft contact lenses used in Examples is as follows:

1-DAY ACUVUE for Astigmatism (Johnson & Johnson Co. Ltd.)
power/DIA/B.C.-2.75/14.5/8.5
ionic hydrogel with 58% moisture content
Menicon 2WEEK DUO (Menicon Co., Ltd.)
power/DIA/B.C.-3.00/14.5/8.6
nonionic hydrogel with 72% moisture content
Menicon 2WEEK PREMIO TORIC (Menicon Co., Ltd.)
power/DIA/B.C.-3.00/14.0/8.6
nonionic silicone hydrogel with 40% moisture content
ACUVUE ADVANCE (Johnson & Johnson Co. Ltd.)
power/DIA/B.C.-3.00/14.0/8.7
nonionic silicone hydrogel with 47% moisture content Examples 1 to 5

A contact lens, 1-DAY ACUVUE for Astigmatism as described above, was immersed in a 0.9% by mass aqueous sodium chloride solution (physiological saline), and left at room temperature for at least one night. Its lens diameter was measured in the physiological saline kept at 20° C., to determine the lens size in the physiological saline before the shrinkage (projector, V-12B manufactured by Nikon Corporation: magnification ×10). It is to be noted that the measurement method for the diameter is a general method based on the description in "ISO 18369-3 (2006): Ophthalmic optics-Contact lenses Part 3: Measurement methods, 4 Methods of measurement for contact lens, 4.3 Diameters and widths".

Aqueous sodium chloride solutions with the respective concentrations set forth in Table 1 were prepared as the liquid for contact lenses. The lens whose lens size had been measured in the physiological saline was immersed in each liquid for contact lenses, and left at room temperature for at least one night.

The lens diameter after the shrinkage was measured in each liquid for contact lenses kept at 20° C. (projector, V-12B manufactured by Nikon Corporation: magnification ×10). Thereafter, the respective lenses were immersed in the 0.9% by mass aqueous sodium chloride solution (physiological saline) at 20° C. for 5 min, followed by the measurement of the lens diameter after the restoration. The lens diameter in each liquid for contact lenses after the shrinkage was subscribed from the lens diameter in the physiological saline before the shrinkage, to determine the difference as the amount of shrinkage (unit: mm). In addition, the diameter in each liquid for contact lenses after the shrinkage was subscribed from the lens diameter in the physiological saline after the restoration, to determine the difference as the amount of restoration (unit: mm). Furthermore, from the amount of shrinkage and the amount of restoration, the restoration rate (unit: %) was determined.

TABLE 1

|  | Example 1 | Example 2 | Example 3 | Example 4 | Example 5 |
| --- | --- | --- | --- | --- | --- |
| Concentration (g/L) | 10 | 11 | 12 | 13 | 14 |
| Osmolarity (mOsm/L) | 321 | 354 | 386 | 415 | 448 |
| Amount of shrinkage (mm) | 0.15 | 0.23 | 0.28 | 0.33 | 0.45 |
| Amount of restoration (mm) | 0.05 | 0.15 | 0.23 | 0.28 | 0.38 |
| Restoration rate (%) | 33 | 65 | 82 | 85 | 84 |

Examples 6 to 10

Examples 6 to 10 were carried out in a similar manner to Examples 1 to 5, except that phosphoric acid-based or boric acid-based buffer (aqueous buffer solution) with the component concentrations set forth in Table 2 were prepared and used as the liquid for contact lenses. It is to be noted that the symbol "-" in Table 2 denotes no blending of the component of interest (the same applies hereinafter).

TABLE 2

| Liquid for contact lenses (phosphoric acid or boric acid buffer) | Example 6 | Example 7 | Example 8 | Example 9 | Example 10 |
|---|---|---|---|---|---|
| Na$_2$HPO$_4$•12H$_2$O (% by mass) | 0.60 | 0.60 | 3.30 | — | — |
| Na$_2$HPO$_4$•2H$_2$O (% by mass) | 0.05 | 0.05 | 0.29 | — | — |
| H$_3$BO$_4$ (% by mass) | — | — | — | 0.15 | 0.15 |
| Na$_2$BO$_7$•10H$_2$O (% by mass) | — | — | — | 0.03 | 0.03 |
| NaCl (% by mass) | 0.83 | 1.28 | 0.83 | 0.80 | 1.25 |
| Osmolarity (mOsm/L) | 315 | 453 | 491 | 288 | 432 |
| Amount of shrinkage (mm) | 0.18 | 0.50 | 0.90 | 0.03 | 0.20 |
| Amount of restoration (mm) | 0.18 | 0.45 | 0.93 | 0.05 | 0.25 |
| Restoration rate (%) | 100 | 90 | 103 | 166 | 125 |

Examples 11 to 13, and Comparative Example 1

Examples 11 to 13 and Comparative Example 1 were carried out in a similar manner to Examples 1 to 5, except that the buffers with component concentration set forth in Table 3 were prepared and used as the liquid for contact lenses.

TABLE 3

| Liquid for contact lenses (buffer) | Example 11 | Example 12 | Example 13 | Comparative Example 1 |
|---|---|---|---|---|
| Tris (% by mass) | 0.30 | 0.30 | — | — |
| Bis-Tris (% by mass) | — | — | 0.30 | 0.30 |
| HCl | q.s. to pH 7.4 | | | |
| NaCl (% by mass) | 0.80 | 1.25 | 1.25 | 0.80 |
| Osmolarity (mOsm/L) | 305 | 443 | 424 | 280 |
| Amount of shrinkage (mm) | 0.05 | 0.30 | 0.25 | -0.15 |
| Amount of restoration (mm) | 0.05 | 0.28 | 0.25 | -0.13 |
| Restoration rate (%) | 100 | 93 | 100 | — |

Tris: trishydroxymethylaminomethane
Bis-Tris: bis(2-hydroxyethyl)imino-tris(hydroxymethyl)methane Example 14

Example 14 was carried out in a similar manner to Examples 1 to 5, except that the liquid for contact lenses used in Example 8 was used again, and 2 WEEK DUO manufactured by Menicon Co., Ltd. was used as the soft contact lens. The amount of shrinkage was 0.60 mm, the amount of restoration was 0.53 mm, and the restoration rate was 88%.

Examples 15 to 17

Menicon 2WEEK PREMIO TORIC, Menicon 2WEEK DUO and ACUVUE ADVANCE were immersed respectively in a physiological saline at 40° C. as the liquid for contact lenses, and further immersed overnight. The diameter of the lenses was measured in the physiological saline while being kept at 40° C. Thereafter, the respective lenses after the measurement were immersed in the physiological saline at 20° C., and their diameters were measured 5 min after the immersion. The diameter value in the physiological saline at 40° C. was subscribed from the initial diameter value, to determine the difference as the amount of shrinkage (unit: mm). In addition, the diameter value in the physiological saline at 40° C. was subscribed from the diameter value in the physiological saline at 20° C., to determine the difference as the amount of shrinkage (unit: mm). The results are shown in Table 4.

TABLE 4

| | Example 15 | Example 16 | Example 17 |
|---|---|---|---|
| Contact lens | Menicon 2 WEEK PREMIO TORIC | Menicon 2 WEEK DUO | ACUVUE ADVANCE |
| Amount of shrinkage (mm) | 0.20 | 0.75 | 0.25 |
| Amount of restoration (mm) | 0.20 | 0.70 | 0.28 |
| Restoration rate (%) | 100 | 93 | 112 |

Reference Example

Ten participants who had used a soft contact lens were questioned whether or not they could recognize the difference in lens diameter between commercially available lenses in the state immediately before the application (in the state of each lens being mounted on a fingertip). The results are shown in Table 5.

TABLE 5

| | Differential lens diameter (mm) | | | | | | |
|---|---|---|---|---|---|---|---|
| | 0.2 | | 0.3 | | 0.5 | | 1.0 |
| Lens diameter of two lenses compared (mm) | 13.8/ 14.0 | 14.0/ 14.2 | 13.5/ 13.8 | 14.2/ 14.5 | 13.5/ 14.0 | 14.0/ 14.5 | 13.5/ 14.5 |
| Number of participants aware of difference in size | 5 | 4 | 9 | 7 | 10 | 10 | 10 |
| Number of participants not aware of difference in size | 5 | 6 | 1 | 3 | 0 | 0 | 0 |

As can be seen in Table 5, about a half of the participants could recognize the difference in lens diameter of as low as 0.2 mm; no less than 70% of the participants could recognize the difference in lens diameter of 0.3 mm; and 100% of the participants could recognize the difference in lens diameter of no less than 0.5 mm.

Furthermore, 10 participants who had used a soft contact lens were asked to actually apply commercially available lenses each having a lens diameter of 13.5 mm, 13.8 mm, 14.0 mm, 14.2 mm and 14.5 mm, to evaluate their ease of application. The results are shown in Table 6.

TABLE 6

| diameter entry | Lens (mm) | | | | |
|---|---|---|---|---|---|
| | 13.5 | 13.8 | 14.0 | 14.2 | 14.5 |
| Number of participants capable of applying easily | 10 | 8 | 6 | 5 | 2 |
| Number of participants capable of applying normally | 0 | 2 | 3 | 2 | 2 |
| Number of participants capable of applying with difficulty | 0 | 0 | 1 | 3 | 4 |
| Number of participants incapable of applying | 0 | 0 | 0 | 0 | 2 |

As can be seen in Table 6, it was found that as the lens diameter increased, the application became arduous, and that when the lens diameter enlarged by at least 0.2 mm, the application became difficult. Stated reversely, it can be seen that when the lens diameter diminishes by 0.2 mm, the application becomes easy.

It was further found that a physiological saline (aqueous sodium chloride solution) and a buffer were possible to be utilized as a liquid for contact lenses capable of shrinking a soft contact lens by adjusting the concentration and temperature of the physiological saline and the buffer.

INDUSTRIAL APPLICABILITY

The method for applying a soft contact lens according to an embodiment of the present invention can facilitate the application of soft contact lenses, and therefore be suitably used in the healthcare industry including ophthalmology, the fashion industry in which colored contact lenses and the like are frequently employed, and the like. Furthermore, the liquid for contact lenses and soft contact lens package according to an embodiment of the present invention can shrink soft contact lenses, and therefore contributes to the improvement of the efficiency of production, distribution, and sale of the soft contact lenses.

What is claimed is:

1. A method of shrinking a soft contact lens, comprising:
shrinking a soft contact lens by contacting the soft contact lens with a liquid having an osmolarity of no less than 370 mOsm/L and no greater than 550 mOsm/L,
wherein:
a diameter of the soft contact lens is shrunken by no less than 0.2 mm as compared to a diameter of the soft contact lens in an equilibrium state in a physiological saline; and
the diameter of the soft contact lens is restored by no less than 80% when applied to an eye.

2. The method of claim 1, wherein the diameter of the soft contact lens is restored by no less than 0.2 mm when applied to the eye.

3. The method of claim 1, wherein the liquid includes sodium chloride at a concentration from 0.83% by mass to 1.28% by mass.

4. The method of claim 1, wherein the liquid includes 0.65% by mass to 3.59% by mass of a phosphoric acid-based buffer.

5. The method of claim 1, wherein the soft contact lens is a hydrous soft contact lens having a moisture content of no less than 30% by mass and no greater than 80% by mass.

6. The method of claim 1, wherein the diameter of the soft contact lens is shrunken by no less than 0.3 mm as compared to the diameter of the soft contact lens in the equilibrium state in the physiological saline.

7. The method of claim 1, wherein the diameter of the soft contact lens is shrunken by up to 1.5 mm as compared to the diameter of the soft contact lens in the equilibrium state in the physiological saline.

8. The method of claim 1, wherein the osmolarity of the liquid is no less than 400 mOsm/L.

9. The method of claim 1, wherein the osmolarity of the liquid is no less than 420 mOsm/L.

10. A method of shrinking a soft contact lens, comprising:
shrinking a soft contact lens by contacting the soft contact lens with a liquid formulated for the soft contact lens at a liquid temperature of no less than 35° C. and no greater than 50° C.,
wherein:
the soft contact lens is shrunken as compared to the soft contact lens being in an equilibrium state in a physiological saline; and
a size of the soft contact lens is increased when applied to an eye.

11. The method of claim 10, wherein:
the liquid has an osmolarity of no less than 370 mOsm/L;
a diameter of the soft contact lens is shrunken by no less than 0.2 min as compared to a diameter of the soft contact lens in the equilibrium state in the physiological saline; and
the diameter of the soft contact lens is restored by no less than 80% when applied to an eye.

12. The method of claim 10, wherein the soft contact lens is a hydrous soft contact lens having a moisture content of no less than 30% by mass and no greater than 80% by mass.

13. A liquid formulated for a soft contact lens that has an osmolarity of no less than 370 mOsm/L and no greater than 550 mOsm/L, wherein the liquid is formulated such that the liquid shrinks a diameter of the soft contact lens by no less than 0.2 mm as compared to a diameter of the soft contact lens in an equilibrium state in a physiological saline, and is formulated such that the diameter of the soft contact lens is restored by no less than 80% when applied to an eye.

14. The liquid of claim 13, including sodium chloride at a concentration from 0.83% by mass to 1.28% by mass.

15. The liquid of claim 13, including 0.65% by mass to 3.59% by mass of a phosphoric acid-based buffer.

16. The liquid of claim 13, wherein the osmolarity of the liquid is no less than 400 mOsm/L.

17. The liquid of claim 13, wherein the osmolarity of the liquid is no less than 420 mOsm/L.

18. A soft contact lens package, comprising:
a soft contact lens container containing a soft contact lens immersed in the liquid of claim 13, wherein the soft contact lens is in a shrunken state such that the soft contact lens has a diameter that is shrunken by no less than 0.2 mm as compared to a diameter of the contact lens in an equilibrium state in a physiological saline.

19. The soft contact lens package of claim 18, wherein the soft contact lens is a hydrous soft contact lens having a moisture content of no less than 30% by mass and no greater than 80% by mass.

* * * * *